July 11, 1933.  W. SAVILLE  1,917,551
TELEPHONE SYSTEM
Filed Feb. 28, 1931
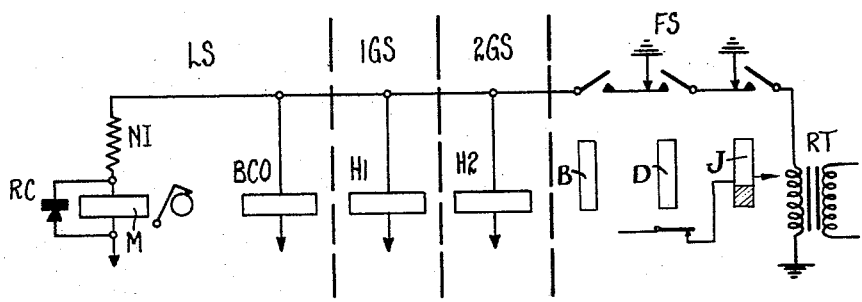
Inventor
Willie Saville
Wm Walter Owen
Atty.

Patented July 11, 1933

1,917,551

UNITED STATES PATENT OFFICE

WILLIE SAVILLE, OF LIVERPOOL, ENGLAND, ASSIGNOR TO ASSOCIATED TELEPHONE AND TELEGRAPH COMPANY, OF CHICAGO, ILLINOIS, A CORPORATION OF DELAWARE

TELEPHONE SYSTEM

Application filed February 28, 1931, Serial No. 518,942, and in Great Britain May 6, 1930.

The present invention relates to telephone systems and is particularly concerned with metering on the so-called booster principle according to which the operation of a meter is effected by modifying the current flow over a conductor used for other purposes. The arrangement usually employed in known systems is that the meter is connected to the holding conductor and is operated by increased current thereover due to the connecting up of a separate booster battery which serves to augment the normal exchange battery voltage. The arrangement in its simplest form however is not quite satisfactory where it is required to operate the meter more than once during any one connection as for instance in a zone metering system. In this case when the potential on the holding conductor is restored to normal, the meter is likely to remain operated unless it has been very carefully and accurately adjusted. The object of the present invention is to provide a metering arrangement which while as simple and reliable as the known arrangement for single metering possesses operating margins sufficiently wide to permit multiple metering to be readily carried out.

According to the invention the operation of the meter is effected by the application of alternating current to the holding conductor to produce a reversal of current flow in the meter circuit and when the current flow is restored to normal there is no doubt that the meter will release.

The invention will be better understood from the following description of one method of carrying it into effect reference being had to the annexed drawing which shows diagrammatically the essential elements of a well-known booster metering circuit to which the invention has been applied. The connections shown extend through the calling party's line switch LS, the first group selector 1GS, the second group selector 2GS and the final selector FS. It will be seen that little change has been made in the known circuits the differences being that the meter is connected to the holding conductor through a non-inductive resistance NI and is shunted by a rectifier couple RC preferably of the copper oxide type and that when metering is to take place the secondary winding of the ringing transformer RT is connected up in place of the usual booster battery.

When the connection has been set up and the wanted party is being rung, relays B and J are operated and the former extends earth from the resting contacts of the back bridge relay D to hold operated the switching relay H1 and H2 in the group selectors, and the bridge-cut-off relay BCO in the calling party's lineswitch. The meter M is also connected to the holding conductor but is inoperative at this time, since the rectifier RC is connected across its winding in such direction as to provide a short-circuiting path under these conditions. It should be mentioned that the non-inductive resistance NI which is conveniently wound on the meter coil is introduced into the circuit to prevent the current flowing through the rectifier causing excessive heating and also to prevent the rectifier shunting too much current from the holding relays.

No further circuit changes take place until the called party answers whereupon relay D operates to open the circuit of relay J and during the slow release period of this latter relay ringing current by way of the ringing transformer RT is connected to the holding conductor in place of the normal earth connection. Since the ringing potential is greater than the battery potential and is of an alternating nature the meter will continue to be short-circuited by way of the rectifier RC during one half of the cycle while the other half will be effective to bring about its operation. Although in these circumstances the meter coil is only intermittently energized, the short-circuiting effect of the rectifier RC during the non-energized periods is sufficient to maintain a holding flux in the coil so that the armature is held continuously and only one meter operation takes place for each application of ringing current. Similarly the shunting effect of the rectifier prevents the release of the holding relays when their normal energizing current is reversed.

When relay J falls away, earth over its resting contacts will be re-applied to the holding conductor to maintain the relay BCO, H1 and H2, and the meter M will then restore owing to the prolonged shunting effect of the rectifier RC. Clearly therefore it would now be possible to operate it again if the circuits were such as to provide for ringing current to be connected up more than once.

What I claim as new and desire to secure by Letters Patent is:—

1. In a telephone system wherein a calling subscriber's meter is operated over a holding conductor over which a current flow must be constantly maintained to prevent release of an established connection; means for introducing a source of alternating current, in the holding circuit, to operate the meter; and means for preventing its being repeatedly operated during the time the alternating current remains in the holding circuit.

2. In a telephone system wherein a calling subscriber's meter is operated over a holding conductor over which a current flow must be constantly maintained to prevent release of an established connection; means for introducing a source of alternating current, in the holding circuit, to operate the meter; and means connected in the holding circuit, in multiple with the meter, for preventing its being repeatedly operated during the time the alternating current remains in the holding circuit.

3. In a telephone system wherein a calling subscriber's meter is operated over a holding conductor by application of an auxiliary potential thereto; the provision of means enabling the employment of alternating current as the auxiliary potential for operating the meter; said means being effective, after the first operation of the meter, to prevent subsequent operations thereof resulting from the alternations of the alternating current.

4. In a telephone system wherein a calling subscriber's meter is operated over a holding conductor by application of an auxiliary potential thereto; the provision of a rectifier unit connected in multiple with the meter, to shunt current from it, and thus prevent its operation by current normally flowing over the holding circuit; and means for connecting meter operating current to the holding conductor in the reverse direction to that normally employed, said rectifier unit functioning in the latter instance as a high resistance to enable sufficient current to flow through the meter to operate it.

5. In a telephone system including arrangements for metering by modifying the current flow over a holding and guarding conductor, in which the meter is connected to the holding conductor and to a pole of potential opposite to that represented by holding potential; a rectifier unit connected in parallel with the meter in such a direction, as to shunt it when normal holding potential is applied to the conductor, and as to offer a high resistance to the current flow over the conductor when modified to operate the meter.

6. In a telephone system wherein a calling subscriber's meter is operated over a holding conductor over which a current flow must be constantly maintained to prevent release of an established connection; a rectifier unit connected in multiple with the meter is to shunt it and thus prevent it from being operated by the normal holding current, and a resistance included in the circuit to limit the shunting effect of the rectifier, on the equipment being held by the holding conductor.

7. In a telephone system, a switch train employed in extending a connection between a calling and a called line, respectively; a holding circuit for the switches of said train including a meter for registering charges to be made for calls extended over the calling line; means in said circuit for preventing holding current, normally supplied over said circuit, from operating said meter, and means for substituting for the normally supplied holding current an alternating current of higher potential than that of the holding current to operate said meter, said means in said circuit also serving to assist said alternating current to maintain the meter operated for the entire period during which the alternating current remains connected in the circuit.

8. In a telephone system, a holding circuit, for maintaining previously operated switches employed in establishing a telephone connection, between two subscribers' stations for the period of the connection, a meter in said circuit for registering charges to be made for such connection; a device connected in said circuit in multiple with said meter normally preventing its operation, but of assistance in maintaining said meter in its operated position after operation thereof; a source of alternating current, and means for connecting said source to said holding circuit to operate said meter.

9. In a telephone system wherein a series of switches are employed to set up a connection between two subscribers' stations and wherein the switches are held in their operated position for the duration of the connection over a holding circuit, the combination with said holding circuit of a meter and meter controlling device traversed by current flowing in said holding circuit, and means for applying a source of alternating current of higher potential than the holding current to the holding circuit to operate said meter, said meter controlling device preventing the meter from subsequent operations otherwise resulting from alternations in the alternating current source.

In testimony whereof I affix my signature.

WILLIE SAVILLE.